United States Patent Office 3,515,734
Patented June 2, 1970

3,515,734
CHOLESTEROL-SUBSTITUTED SILOXANES
Robert S. Craig, Waukegan, Ill., assignor to General Electric Company, a corporation of New York
No Drawing. Filed Dec. 1, 1967, Ser. No. 687,121
Int. Cl. C07c 169/64
U.S. Cl. 260—397.2
10 Claims

ABSTRACT OF THE DISCLOSURE

One or more cholesterol radicals are joined to a siloxane through a urethane alkyl or an ester alkyl linkage. A compound within the scope of the disclosure is made by reacting a cholesterol with a siloxane of the average formula:

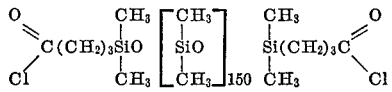

The compounds of the present disclosure are useful in sunburn preventative formulations.

---

This invention relates to compounds containing radicals derived from cholesterol joined to siloxanes through ester alkyl or urethane alkyl radicals.

Cholesterol-containing compositions have been used for hundreds, if not thousands, of years for cosmetic purposes. Compositions such as lanolin are used in cleansing creams, night creams, hormone cosmetic preparations, cosmetic cream bases, sun protective creams, oilproof creams, hair dressings, cream rouges and lipsticks.

Lanolin is also useful in waterproof coating compositions for machinery and parts, thus making it useful both as a water barrier and an oil barrier forming material. As a waterproof coating composition lanolin is usually mixed with wax.

Lanolin can be made compatible with a siloxane by chemically combining the two materials. The chemical combination offers advantages heretofore not found in either component separately.

Used in a skin cosmetic preparation the chemical combination provides an appearance of freshness and moistness as opposed to the prior art appearance provided by lanolin of being slightly oily. In addition, the lanolin improves the sun screening properties of the siloxane.

When the siloxane of the chemical combination contain ≡SiH groups, a curable coating composition results. Cure is effected by the reaction of the ≡SiH groups with the olefinic groups of the cholesterol radicals. The coating produced is much more flexible and is less likely to be knocked off in shipping than the prior art brittle wax-lanolin mixtures.

The compounds of the present invention fall within the scope of the average unit formula:

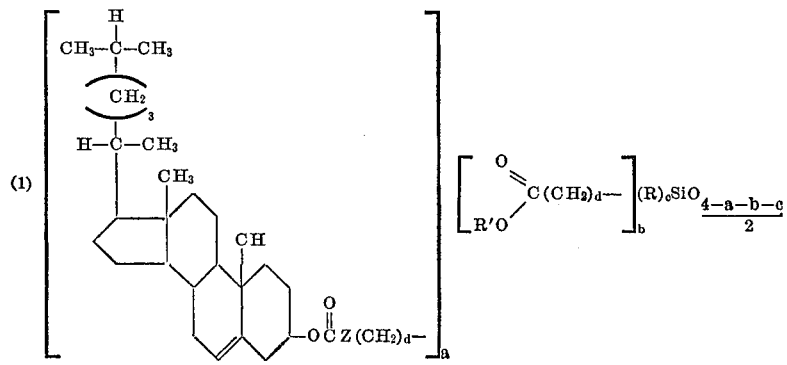

where R and R' are selected from the class consisting of hydrogen, monovalent hydrocarbon radicals and substituted monovalent hydrocarbon radicals, Z is a link between the sterol radical and the siloxane radical and can be a covalent carbon to carbon bond, a

radical and a

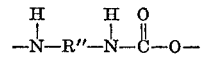

radical, R'' is a divalent organic radical, $a$ has a value of 0.001 to 0.5, $b$ has a value of 0 to 0.999, $c$ has a value of 1.002 to 2.5, the sum of $a$ plus $b$ plus $c$ has a value of 2.002 to 3.0, and $d$ is an integer having a value of 3 when the Z radical is attached to the $(CH_2)_d$— radical through a carbon to nitrogen bond and $d$ is an integer having a value of 2 to 3 when the Z radical is attached to the $(CH_2)_d$— radical through a carbon to oxygen bond, and also has a value of 2 to 3 when the Z radical is a carbon to carbon bond.

Units of Formula 1 are characterized by the presence of 1 or more radicals derived from cholesterol attached to a siloxane chain. The attachment can be through a carboxyalkyl radical formed by the reaction of the hydroxyl group of the cholesterol with a carboxyalkyl or haloacylalkyl radical of the siloxane. The substituted alkyl radical is attached to the siloxane by a carbon-silicon bond.

The attachment can also be through a urethanealkyl radical. This is formed by a two-step reaction. The first step is the reaction of allylisocyanate with cholesterol to form a compound having a terminal olefinic group attached to a cholesterol radical through a urethane. The second step is an SiH-olefin addition reaction of the terminal olefinic group of the cholesterol derivative with a ≡SiH containing siloxane. The attachment may also be through a urethane hydrocarbon urethanealkyl bridge. This is accomplished by reacting cholesterol with an equimolar amount of a hydrocarbon derivative containing two isocyanate radicals to produce an isocyanate terminated cholesterol derivative. This isocyanate terminated derivative is then reacted with a siloxane containing one or more hydroxyalkyl groups.

Compounds within the scope of Formula 1 are further characterized by the presence of 1 or more carboxy or urethane radicals attached to a silicon atom of a siloxane through an alkylene radical. At least one of the attached carboxy or urethane radicals present on each siloxane are also attached to a cholesterol radical. The remaining carboxy or urethane groups, if any, can be carboxylic acid radicals and ester radicals formed by the reaction of the carboxylic acid radicals with alcohols.

As can be seen by the formulas shown in parenthesis below relating to the urethanealkyl radicals, the bond joining the urethane radical to the alkylene radical is a carbon to oxygen bond when the urethane radical is on the beta carbon atom of the alkylene chain and is a carbon to oxygen bond or a carbon to nitrogen bond when the urethane radical is on the gamma carbon atom of the alkylene chain.

The carboxyalkyl or urethanealkyl radical is further characterized by the fact that the carboxyl or urethane group is attached to a silicon atom through a 2 or 3 carbon alkylene chain. Thus, the carboxyalkyl radical can be a beta-carboxyethyl radical $$(-CH_2CH_2\overset{O}{\underset{\|}{C}}-O-)$$

a beta-carboxypropyl radical $$(-CH_2\underset{|}{CH}-CH_2) \quad \overset{O}{\underset{\diagdown O-}{\overset{\diagup}{C}}}$$

or a gamma-carboxypropyl radical $$\left(-CH_2CH_2CH_2\overset{O}{\underset{\diagdown O-}{\overset{\diagup}{C}}}\right)$$

The urethanealkyl radical can be a beta-urethaneethyl radical $$(-CH_2CH_2-O-\overset{O}{\underset{\|}{C}}-\overset{H}{\underset{|}{N}}-)$$

a beta-urethanepropyl radical $$(-CH_2\underset{|}{CH}-CH_3) \quad O-\overset{O}{\underset{\|}{C}}-\overset{H}{\underset{|}{N}}-$$

or a gamma-urethanepropyl radical $$\left[\begin{array}{c}(-CH_2CH_2CH_2\overset{H}{\underset{|}{N}}-\overset{O}{\underset{\|}{C}}-O-) \\ (-CH_2CH_2CH_2-O-\overset{O}{\underset{\|}{C}}-\overset{H}{\underset{|}{N}}-)\end{array}\right]$$

For the purposes of the present invention, a carboxyalkyl radical is defined as a carboxy radical bonded to an alkylene radical by a carbon to carbon bond. A urethane alkyl radical is defined as a urethane radical bonded to an alkylene radical either through a nitrogen to carbon bond, e.g., $$----O-\overset{O}{\underset{\|}{C}}-\overset{H}{\underset{|}{N}}-(\text{alkylene})-$$

or a carbon to oxygen bond, e.g., $$----\overset{H}{\underset{|}{N}}-\overset{O}{\underset{\|}{C}}-O-(\text{alkylene})$$

Among the radicals represented by R of Formula 1 can be mentioned, for example, hydrogen, alkyl radicals, e.g., methyl, ethyl, propyl, butyl, octyl, etc. radicals; cycloalkyl radicals, e.g., cyclohexyl, cycloheptyl, etc. radicals; aryl radicals, e.g., phenyl, tolyl, naphthyl, xylyl, etc. radicals; aralkyl radicals, e.g., benzyl, phenylethyl, etc. radicals; halogenated derivatives of the above-mentioned radicals, e.g., chloromethyl, chlorophenyl, dibromobenzyl, etc. radicals and cyanoalkyl radicals, e.g., cyanoethyl, cyanopropyl, etc. radicals. In the preferred embodiment of my invention, the R radical is an alkyl or aryl radical, with the methyl and phenyl radicals being specific preferences.

Among the radicals represented by R' of Formula 1 can be mentioned, for example, hydrogen, alkyl radicals, e.g., methyl, ethyl, propyl, butyl, octyl, etc. radicals; cycloalkyl radicals, e.g., cyclohexyl, cycloheptyl, etc. radicals; aralkyl radicals, e.g., benzyl, phenylethyl, etc.

radicals; alkenyl and cycloalkenyl radicals, e.g., allyl, cyclohexenyl, etc. radicals, and halogenated derivatives of the aforementioned radicals, e.g., chloromethyl, chlorobenzyl, and chloroallyl radicals. The R' radical can be derived from any alcohol capable of entering an esterification reaction but it is preferably a lower alkyl radical having 1 to 7 carbon atoms.

Among the radicals represented by Z of Formula 1 can be mentioned $$-\overset{H}{\underset{|}{N}}-$$

and $$-\overset{H}{\underset{|}{N}}-R''-\overset{H}{\underset{|}{N}}-\overset{O}{\underset{\|}{C}}-O-$$

radicals where R'' is a divalent organic radical selected from the class consisting of alkylene, cycloalkylene, and arylene radicals. Among the alkylene radicals represented by R'' may be mentioned ethylene, propylene, butylene, octylene, etc. radicals. Among the cycloalkylene radicals represented by R'' may be mentioned cyclohexylene, cycloheptylene, etc. radicals; among the arylene radicals represented by R' may be mentioned phenylene [⌬]

tolylene [⌬—CH₃]

and naphthylene [⌬⌬]

etc. radicals.

In the preferred embodiment of my invention, the alkyl substituents represented by R of Formula 1 are methyl radicals, Z is a $$-\overset{H}{\underset{|}{N}}-$$

radical, $a$ has a value of 0.01 to 1, $b$ has a value of 0, $c$ has a value of 2, the sum of $a$ plus $b$ plus $c$ has a value of 2.01 to 2.1, and $d$ has a value of 3.

A compound within the scope of Formula 1 can be readily formed by the esterification of a compound within the scope of the average unit formula:

(2)
$$\left[X-\overset{O}{\underset{\|}{C}}(CH_2)_d-\right]_y(R)_c SiO_{\frac{4-y-c}{2}}$$

with cholesterol, a compound of the formula:

(3)

[Structure of cholesterol showing: CH₃—C(H)—CH₃ group with (CH₂)₃ chain connecting to H—C—CH₃, attached to steroid ring system with CH₃ groups and an OH substituent]

where R, $c$ and $d$ are as previously defined, X is selected from the class consisting of hydroxyl, fluoride, chloride, bromide, iodide, methoxy, ethoxy and propoxy, $y$ has value of 0.001 to 1 and the sum of $c$ plus $y$ has a value of 2.002 to 3.0. When X is an alkoxy group the reaction proceeds via an ester exchange reaction.

Generally speaking, 10 hours at 100° C. is sufficient for an esterification reaction using a carboxylic acid or an ester exchange reaction using a carboxylic acid ester. The time and temperature are dependent upon the removal of by-product water or alcohol formed during the esterification or ester exchange reaction. At 100° C., this is easily accomplished at atmospheric pressure.

When the acyl halide is used to form the ester, an esterification catalyst is not required; however, an acid acceptor is generally employed to remove by-product acid from the system.

When the direct esterification reaction employing the carboxylic acid or the ester exchange reaction employing the carboxylic acid ester is employed to form the products of the present invention, acidic catalysts may be used, such as para-toluene sulfonic acid, sodium acid sulfate, hydrochloric acid, sulfuric acid, acid clays, etc. Generally speaking, small amounts of any acid can be employed. Metals and metal salts, such as tin, lead, zinc, stannous chloride, tetrabutyl titanate, etc., may also be employed. In the ester exchange reaction, an alkaline catalyst may also be used, such as sodium methoxide and aluminum ethoxide.

Solvents which may be employed include the usual inert hydrocarbon solvents, such as benzene, toluene, xylene, etc.

The esters of the present invention owe their existence to the hydroxy group of cholesterol, which reacts with a carboxyl or acid halide group of the siloxane. The hydroxyl group of cholesterol can also be transesterified by reaction with an ester of a carboxyalkylpolysiloxane.

The practical temperature range of the esterification reaction can vary from room temperature to 300° C., dependent upon reactants, time, temperature, solvents, catalyst, etc.

When a siloxane-containing acyl halide group is used to form an ester, the time and temperature requirements are at a minimum, four hours at room temperature being sufficient for the usual reaction.

The preferred method of conducting the above reaction is by use of the acid chloride. The acid chloride within the scope of Formula 2 is prepared by reacting a carboxyalkylsiloxane with thionyl chloride. The conversion of the carboxyalkylsiloxane to the acid chloride is best run with a 150% excess or more of thionyl chloride.

A siloxane-containing carboxyalkyl group within the scope of Formula 2 can be readily formed by the hydrolysis and condensation of a diorganodichlorosilane having the formula:

$$R_2SiCl_2$$

and/or a triorganochlorosilane having the formula::

$$R_3SiCl$$

with a cyanoalkyldichlorosilane having the formula:

$$RSi(Cl)_2(CH_2)_dCN$$

and/or a cyanodialkylchlorisilane having the formula:

$$R_2SiCl(CH_2)_dCN$$

When the products of the present invention are to be used as protective coating compositions, it is preferred that some chain branching exist. This is accomplished by adding a trichlorosilane having the formula:

$$RSiCl_3$$

to the mixture. In the above formulas, R is as previously defined, and $d$ is an integer having a value of 2 to 3. Details of the hydrolysis and condensation reaction can be found in U.S. Pat. 3,182,976—Holdstock.

A compound within the scope of Formula 1 containing a urethanealkyl radical interposed between the sterol and siloxane can be readily formed by reacting cholesterol with allylisocyanate to produce a compound having the formula:

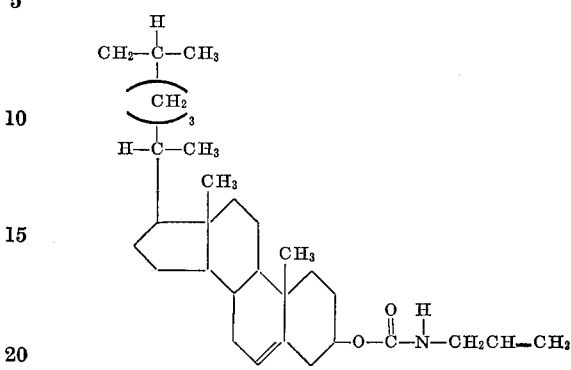

which in turn is reacted with a siloxane containing one or more ≡SiH groups and falling within the scope of the average unit formula:

(4)  $(H)_y(R)_cSiO_{\frac{4-y-c}{2}}$ to produce a compound within the scope of Formula 1. In the above formulas, R, $c$ and $y$ are as previously defined.

A compound within the scope of Formula 1 containing one or more cholesterol radicals joined to a siloxane through a urethane-arylene-urethane radical or a urethane-alkylene-urethane radical can be readily formed by the reaction of a compound within the scope of Formula 3, with a compound within the scope of the formula:

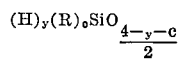

to produce a compound within the scope of the formula:

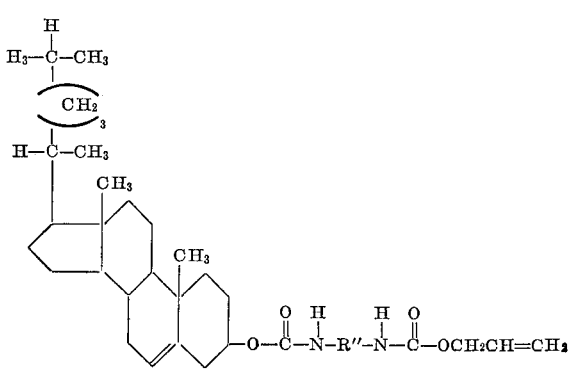

The compound produced is then reacted with a compound within the scope of Formula 4 to produce a compound within the scope of Formula 1 having at least one cholesterol derivative radical joined to a siloxane through a urethane-arylene-urethane or a urethane-alkylene-urethane radical. In the above formulas, R, R″—, $c$ and $y$ are as previously defined.

Some of the methods of making the urethane-containing compounds having terminal olefin groups involve reacting an isocyanate-terminated compound with a hydroxy compound to produce a cholesterol derivative containing terminal olefin radicals. A dibutyl tin dilaurate catalyst is preferably used in this type of reaction, though a large number of other catalysts, including other tin salts, can also be used in lieu thereof. Other catalysts which may be used include, for example, aromatic and cyclic tertiary amines, such as pyridine, diazabicyclo - 2,2,2-octane, and derivatives thereof.

The reaction is preferably run at 20° C. to 150° C. at atmospheric pressure. The range is not critical, though compensation must be made to achieve optimum conditions, depending upon catalyst activity, concentration or reactants, etc.

The time for completion of the reaction can vary from 3 minutes at 150° C. to one hour or more at room temperature.

Another method for making compounds within the scope of Formula 1 is by reacting a siloxane containing one or more hydroxy ethyl or hydroxy propyl groups per siloxane molecule with a cholesterol derivative containing terminal isocyanate groups.

The cholesterol derivative containing a terminal olefin group is then reacted with a siloxane containing one or more ≡SiH groups per siloxane molecule. Any catalyst which is operative to catalyze the addition of silicon-hydrogen bonds across olefinic double bonds can be employed as a catalyst for preparing the materials of the present invention. Among the many useful catalysts for this addition reaction are finely divided platinum as described in Pat. 2,970,150—Bailey, chloroplatinic acid as described in U.S. Pat. 2,823,218—Speier et al., the reaction product of chloroplatinic acid with either an alcohol, an ether or an aldehyde as described in U.S. Pat. 3,220,972—Lamoreaux, trimethyl platinum iodide and hexamethyldiplatinum as described in U.S. Pat. 3,313,773—Lamoreaux, and the platinum olefin complex catalysts as described in U.S. Pats. 3,159,601 and 3,159,662—Ashby.

The catalyst which was used in the SiH-olefin addition reactions in the following examples was a platinum coordinate catalyst formed by the reaction of chloroplatinic acid and octyl alcohol. The preparation of the catalyst is disclosed in Example 1 of U.S. Pat. 3,220,972 of Lamoreaux. The catalyst is dissolved in 4 times its weight of toluene to produce the catalyst solution used in the following examples. Chemical analysis of this solution showed it to contain 3.5 atoms of chlorine per atom of platinum and 0.007 gram of platinum per gram of solution.

The concentration of reactants is not critical and can vary from a ratio of one equivalent of the cholesterol or derivative thereof to 10 equivalents of the siloxane to 10 equivalents of the cholesterol or derivative thereof to one equivalent of the siloxane.

In addition to cholesterol in its pure form, animal extracts containing cholesterol may also be used in the practice of the present invention. Other sterols can also be present in these mixtures and form reaction products with the siloxanes in the same manner as cholesterol. Other sterols can also be substituted for cholesterol.

The following examples are illustrative of the practice of my invention and are not intended for purposes of limitation.

The following reactions were conducted in a 1-liter 3-necked flask fitted with a thermometer, a stirrer, a Barrett trap, and a condenser.

EXAMPLE 1

Into the 1-liter flask was placed 100 grams of a chloroacylpropyldimethylsilyl end-stopped polysiloxane of the average formula,

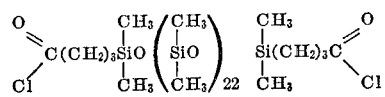

Into a separate flask 60 grams of lanolin and 7.6 grams of pyridine were dissolved in 200 ml. of dry toluene. The mixture was added slowly to the acid chloride with agitation. The flask and contents were then maintained at reflux temperature for 2 hours and cooled. Pyridine hydrochloride was then removed by filtering the reaction mixture through fuller's earth. The reaction mixture was reheated to 100° C. at 10 mm. pressure to distill off the toluene. The product was a cloudy fluid. An infrared spectrum of the fluid showed the existence of the —COOR band at 5.75 microns but no band was shown at 5.5 microns indicating the absence of any appreciable quantity of unreacted —COCl groups. The product is the carboxypropylsiloxane ester of cholesterol, which is within the scope of Formula 1 when R is methyl, Z is a carbon to carbon bond, $a$ and has a value of 0.083, $b$ has a value of 0, $c$ has a value of 2, the sum of $a$ plus $b$ plus $c$ has a value of 2.083, and $d$ has a value of 3.

EXAMPLE 2

Into the 1-liter flask was placed 100 grams of a chloroacylpropyldimethyl chain-stopped siloxane containing an average of 19.2 dimethylsiloxane units and 5 methylhydrogensiloxane units per molecule. The siloxane has the average formula,

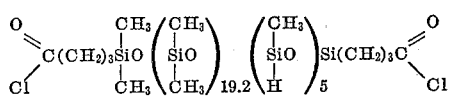

In a separate flask 50 grams of lanolin and 8 grams of pyridine were dissolved in 200 ml. of dry toluene. The solution was added to the 1-liter flask containing the acid chloride, slowly and with agitation. The reaction mixture was formed, then heated to reflux temperature and maintain at reflux for 2 hours, cooled to 70° C. and 3 grams of isopropyl alcohol was added. The reaction mixture was reheated and maintained at reflux for an additional one-half hour, cooled and filtered through fuller's earth to remove pyridine hydrochloride which has formed in the reaction. The reaction mixture was then heated to 100° C. and the toluene and excess pyridine were then stripped off at 10 mm. The infrared spectrum of the fluid failed to indicate the existence of this —COCl band at 5.5 microns. The infrared spectrum did show the existence of the —COOR band at 5.75 microns. The ≡SiH band was present at 4.6 microns and 11.0 microns. The product was a clear, yellow-orange fluid having a viscosity of 315 centistokes at 77° C.

The product is a mixed carboxypropylsiloxane ester of cholesterol and isopropyl alcohol and is within the scope of Formula 1 when R is a mixture of hydrogen and methyl, R' is isopropyl, Z is a carbon to carbon bond, $a$ has a value of 0.066, $b$ has a value of 0.007, $c$ has a value of 2, the sum of $a$ plus $b$ plus $c$ has a value of 2.073 and $d$ has a value of 3.

EXAMPLE 3

Into the 1-liter flask was placed 200 grams of lanolin having a hydroxyl number of 106, 200 ml. of dry toluene, and 0.4 gram of dibutyl tin dilaurate. Slowly and with agitation, 37 grams of allyl isocyanate was added. The reaction mixture was maintained at 90° C. for 2 hours. The product formed by the above reaction was filtered, heated to 100° C. and the toluene and low boiling point contaminants were removed at 10 mm. Into a second 1-liter flask equipped in the same manner as the first, was placed 4.5 grams of the above lanolin-allylisocyanate reaction product, 100 ml. of toluene and 0.1 ml. of the platinum-coordinate catalyst solution described earlier The mixture was then heated to reflux temperature and dropwise and with agitation was added 111 grams of a siloxane having the average formula,

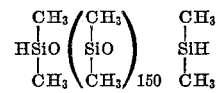

After the addition was completed the reaction mixture was maintained at reflux for a period of 2 hours, then cooled and filtered. The mixture was then reheated to 100° C. and the toluene and lower boiling components were stripped off at 10 mm. The infrared spectrum of the product showed the

band at 3.1 microns and the —COOR band at 5.75 microns. The spectrum also showed a great reduction in intensity of the ≡SiH bands at 4.6 microns and 11.0 microns when compared with the initial reaction mixture. The product was a clear yellow viscous fluid. The product is a polysiloxane containing cholesterol radicals joined to a siloxane chain through urethane propyl radicals and is within the scope of Formula 1 when R is methyl, Z is

$a$ has a value of 0.013, $b$ has a value of 0, $c$ has a value 2, the sum of $a$ plus $b$ plus $c$ has a value of 2.013, and $d$ has a value of 3.

EXAMPLE 4

Into the 1-liter flask was placed 20 grams of cholesterol, 100 ml. of toluene, 100 ml. of carbon tetrachloride, and 105 grams of a siloxane of the Formula,

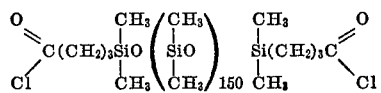

To the reaction mixture formed was added slowly and with agitation 4 ml. of pyridine. The reaction mixture was then heated to reflux temperature and maintained at reflux for 2 hours, cooled and allowed to stand overnight. The mixture was then filtered through fuller's earth. The cholesterolsiloxane reaction produced by the above reaction was filtered through fuller's earth; 75 grams of acetic acid was then added to the copolymer. The two phase mixture produced was placed in a separatory funnel and fraction containing acetic acid, pyridine acetate, pyridine hydrochloride, was drained off. The cholesterol-siloxane reaction product was then dissolved in toluene and again filtered through fuller's earth. The solution was heated to 100° C. and toluene was stripped off at 10 mm. The product was a clear, yellow viscous fluid. The product was a compound within the scope of Formula 1 when R is methyl, Z is a carbon to carbon bond, $a$ has a value of 0.013, $b$ has a value of 0, $c$ has a value of 2, the sum of $a$ plus $b$ plus $c$ has a value of 2.013 and $d$ has a value of 3.

EXAMPLE 5

A sunburn preventive cream was prepared from the cholesterol-siloxane product of Example 4. A mixture was formulated containing 45 grams of the Example 4 product, 5 grams of propylene glycol, 3 grams of finely divided titanium oxide, 2 grams of finely divided iron oxide, ($Fe_2O_3$), 0.2 gram of methyl-parahydroxybenzoate and 2 grams of isobutyl-para-aminobenzoate. The mixture was subjected to high shear agitation and 50 grams of water was slowly added. The cream produced was tested and it was found that the application of the cream to the body gave the skin the appearance of being moist and fresh. The cream also made the skin very smooth to the touch. The film produced on the skin did not wash off in the water but was easily removed using soap and water. The film provided excellent protection against sunburn.

What I claim as new and desire to secure by Letters Patent of the United States is:

1. A compound containing a siloxane joined to at least one radical derived from cholesterol, the compound having the average unit formula:

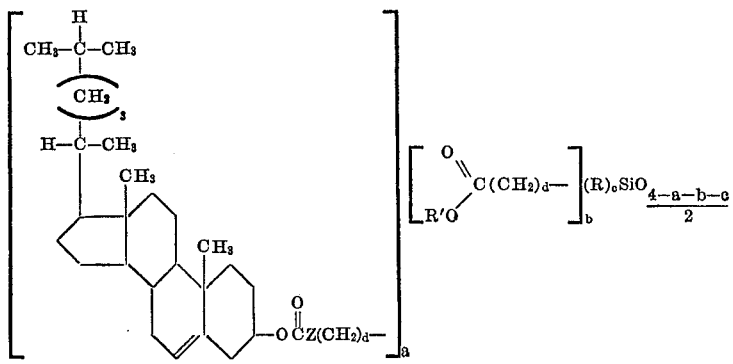

where R is selected from the class consisting of hydrogen, alkyl radicals, alkenyl radicals, cycloaliphatic radicals, aryl radicals, aralkyl radicals, halogenated derivatives of the above radicals, and cyanoalkyl radicals; R' is selected from the class consisting of hydrogen, alkyl radicals, alkenyl radicals, cycloaliphatic radicals, aralkyl radicals and halogenated derivatives of the above radicals; Z is selected from the class consisting of a carbon to carbon bond, a

radical joined to two carbon atoms; and a

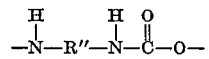

radical joined to the $(CH_2)_d$ group through a carbon to oxygen bond, R" is selected from the class consisting of alkylene radicals and arylene radicals; $a$ has a value of 0.001 to 0.5, $b$ has a value of 0 to 0.999, $c$ has a value of 1.002 to 2.5, the sum of $a$ plus $b$ plus $c$ has a value of 2.002 to 3, and $d$ is an integer having a value of 2 to 3 when the Z radical is a carbon to carbon bond and when the Z radical is attached to the $—(CH_2)_d$ radical through a carbon to oxygen bond and $d$ has a value of 3 when Z is attached to the $—(CH_2)_d$ radical through a carbon to nitrogen bond.

2. The compound of claim 1 in which R is methyl, Z is a

radical, $a$ has a value of 0.1 to .1, $b$ has a value of 0, $c$ has a value of 2, the sum of $a$ plus $b$ plus $c$ has a value of 2.01 to 2.5, and $d$ has a value of 3.

3. The compound of claim 1 where R is a methyl radical.

4. The compound of claim 1 where Z is a

radical.

5. The compound of claim 1 where $a$ has a value of .01 to 1.

6. The compound of claim 1 where $b$ has a value of 0.

7. The compound of claim 1 where $c$ has a value of 2.

8. The compound of claim 1 where the sum of $a$ plus $b$ plus $c$ has a value of 2.01 to 2.1.

9. The compound of claim 1 where Z is a carbon to carbon bond.

10. The compound of claim 1 where R' is a lower alkyl radical having 1 to 7 carbon atoms.

No references cited.

ELBERT L. ROBERTS, Primary Examiner

U.S. Cl. X.R.

424—238